United States Patent [19]
Smith

[11] Patent Number: 5,845,937
[45] Date of Patent: Dec. 8, 1998

[54] STRUCTURAL ASSEMBLY

[75] Inventor: Bradley W. Smith, Ogden, Utah

[73] Assignee: Morton International, Inc., Chicago, Ill.

[21] Appl. No.: 797,179

[22] Filed: Feb. 10, 1997

[51] Int. Cl.⁶ .................................................. B62D 21/15
[52] U.S. Cl. ........................................ 280/784; 280/756
[58] Field of Search .................... 280/784, 756, 280/728.1

[56] References Cited

U.S. PATENT DOCUMENTS

| | | | |
|---|---|---|---|
| 1,150,811 | 8/1915 | Cooke | 296/212 |
| 3,603,535 | 9/1971 | DePolo | 274/121 |
| 3,638,992 | 2/1972 | Forshee | 296/39.1 |
| 3,791,667 | 2/1974 | Haviland | 280/730.2 |
| 3,822,076 | 7/1974 | Mercier et al. | 293/107 |
| 3,971,583 | 7/1976 | Kornhauser | 293/110 |
| 4,050,537 | 9/1977 | Bez | 280/784 |
| 4,093,302 | 6/1978 | Adams | 296/156 |
| 4,215,878 | 8/1980 | Hirbod | 280/737 |
| 4,217,970 | 8/1980 | Chika | 180/298 |
| 4,272,119 | 6/1981 | Adams | 296/100 |
| 4,355,844 | 10/1982 | Muzzarelli | 280/784 |
| 4,553,783 | 11/1985 | Lagana | 296/186 |
| 5,097,548 | 3/1992 | Heck et al. | 5/482 |
| 5,382,051 | 1/1995 | Glance | 280/751 |
| 5,429,851 | 7/1995 | Sallee | 428/71 |
| 5,558,627 | 9/1996 | Singer et al. | 602/13 |
| 5,727,815 | 3/1998 | Smith | 280/784 |
| 6,971,588 | 7/1976 | Bauer | 280/784 |

*Primary Examiner*—Kenneth R. Rice
*Attorney, Agent, or Firm*—George W. Rauchfuss, Jr.

[57] ABSTRACT

The assembly is useful in protecting occupants of a motor vehicle in the event of a collision. It includes a substantially closed rigid tubular metal element connected to a source of generating fluid pressure, such as a gas-generating inflator. The element is in flattened condition when installed. At the time of an imminent accident, the inflator generates fluid pressure to enlarge the flattened tubular element to increase its rigidity, strength, and resistance to buckling.

23 Claims, 2 Drawing Sheets

STRUCTURAL ASSEMBLY

FIELD OF THE INVENTION

This invention relates to a structural assembly adapted particularly for use in reinforcing parts of vehicles at the instant of a collision or other accident. More specifically, this invention relates to a structural assembly, particularly for a motor vehicle, comprising a compact flattened tubular metal element which may be inflated by a fluid pressure generating source, such as a gas-generating inflator, to enlarge it and make it more rigid.

BACKGROUND OF THE INVENTION

To protect the driver and passengers in a vehicle, many advances have been made in the form of airbags and sensors to sense an impact and to activate an inflator to deploy the airbag. Such airbags have been situated either in the steering wheel, the dashboard or instrument panel in front of the passenger, or, for side impacts, in the seat between the occupant of the seat and the door of the car or in a pillar or door panel along the exterior wall of the vehicle.

The strengthening of the vehicle itself in areas of likely impact has been also effected, always by the addition or strengthening of reinforcing elements in the body of the car, doors, frame, or roof. There is, of course, a limit to the amount of reinforcing metal which may be added: namely a severe restriction on the amount of room in these places.

The present invention addresses this problem by providing a structural element of a motor vehicle which is normally in a compacted state but which, upon impact as in a collision, is greatly enlarged by being inflated. This results in a structural element which provides increased protection for the occupant of the vehicle.

SUMMARY OF THE INVENTION

In summary, the invention is an elongate rigid hollow tubular metal element normally mounted in a motor vehicle in collapsed shape wherein its side wall portions are compacted into tight accordion-like folds, the interior of the element being substantially closed to the atmosphere. Connected to the interior of the rigid tubular metal element is an activatable fluid pressure-generating source, such as a gas-generating inflator. By stating that the tubular element is "substantially closed to the atmosphere" it is meant that the element is sufficiently closed to permit fluid pressure to buildup therein to expand the collapsed shape, but may have small vent openings in the element to permit slow venting of the pressurized fluid from the element following expansion of the element.

Such an assembly of collapsed tubular element and inflator may be located in any suitable position in a motor vehicle, for instance, in the roof, doors or adjacent the frame of the vehicle so that, in the event of a collision, a sensor can activate the inflator to deliver fluid pressure to the compacted rigid tubular element expanding it into a larger cross-section, stronger element less likely to buckle and more able to resist intrusion into the space defining the vehicle.

In a preferred form, the rigid tubular metal element may have an original unflattened or erect, rectangular or square cross-sectional shape including opposite side wall portions. The element may be transversely collapsed to a collapsed shape wherein the side wall portions are compacted into generally tight accordion folds. Upon initiation of the inflator, at the instant of an accident, the fluid pressure generated by the fluid pressure generating source restores the collapsed tubular element to substantially its original cross-sectional shape.

BRIEF DESCRIPTION OF THE DRAWINGS

Other objects and features of the invention will be apparent to those skilled in the art from a study of the following specification with reference to the drawings, all of which disclose a non-limiting embodiment of the invention. In the drawings.

DESCRIPTION OF THE PREFERRED EMBODIMENT

Figure 2:
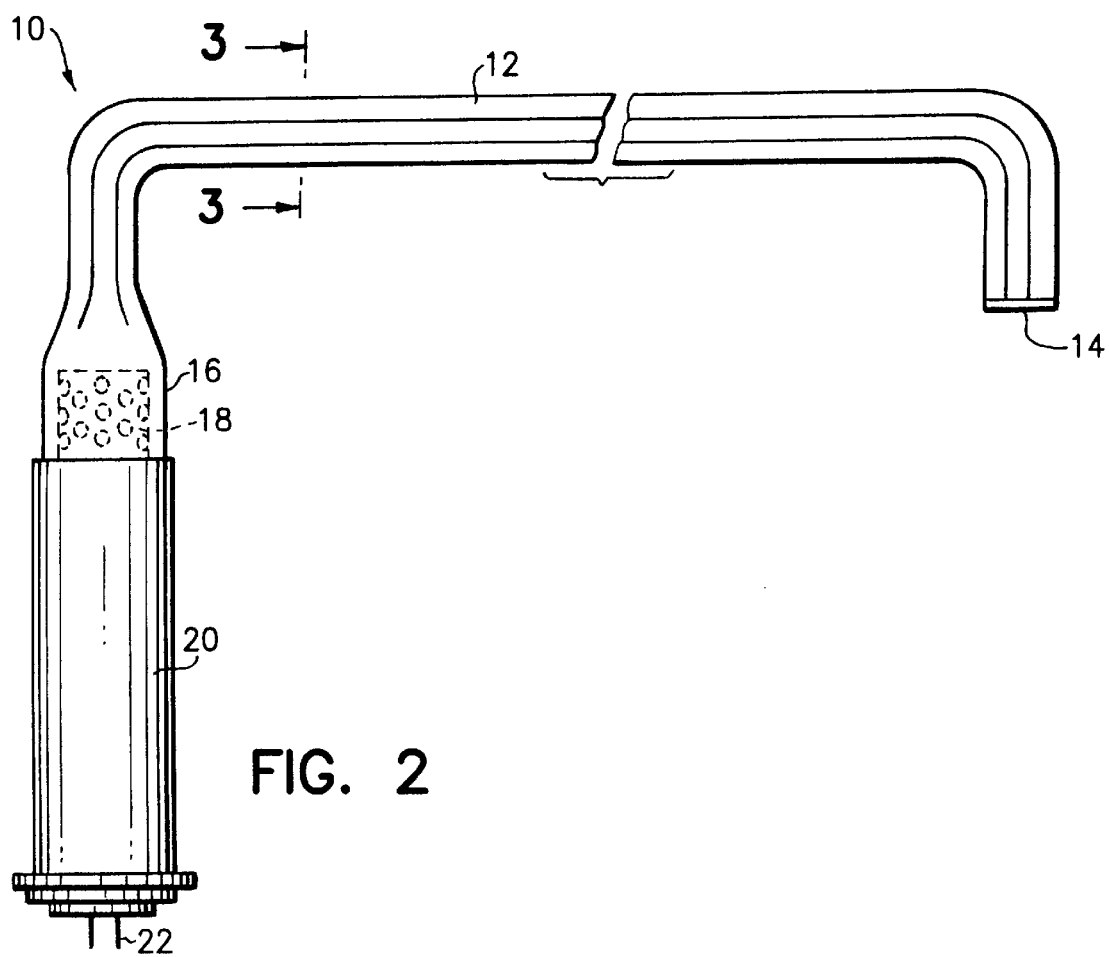
FIG. 2 is a greatly enlarged, somewhat schematic view of a structural assembly embodying the invention suitable as a roll bar as it appears in compact form prior to an accident.

An exemplary structural assembly embodying the invention is shown in FIG. 2 and generally designated 10. It comprises an elongate rigid metal tubular element 12 shown in collapsed form. One end of the element is sealed off as at 14 while the other end, uncollapsed, as at 16, is fitted and sealed over the fluid discharge outlet 18 of a gas-generating inflator 20, such as a typical airbag inflator. As shown, the discharge outlet 18 of the inflator 20 can extend part way into the interior of the tubular element 12. However, it is only necessary that this discharge outlet be in fluid communication with the interior of the tubular element but need not extend therein.

The inflator, preferably a cylindrical airbag type, is well known in the art and may be of the pyrotechnic, stored gas, hybrid or fluid fueled type and is provided within with an initiation or actuation means (not shown) from which the usual leads 22 are connected to sensors and power source as is well known in the art.

Figure 4:
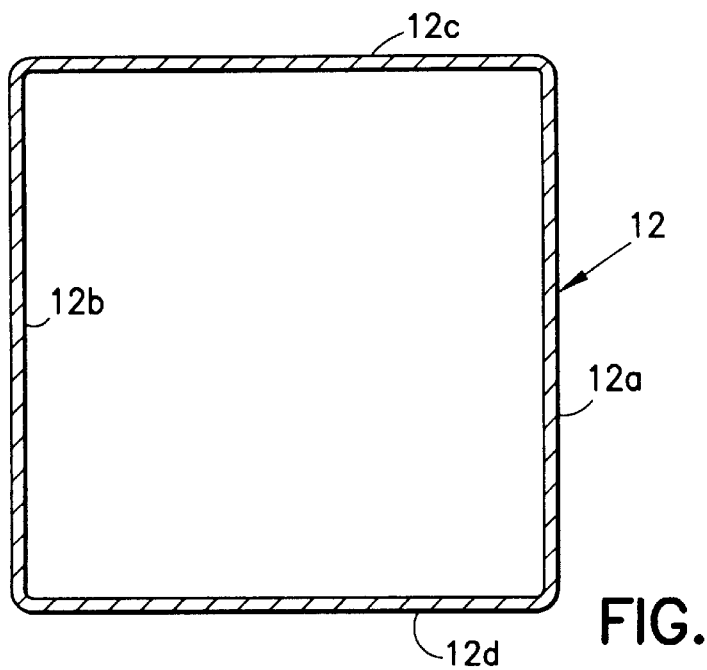
FIG. 4 is a sectional view of the element of FIG. 3 either prior to collapsing for forming the element or after inflation thereof.

FIG. 4 shows in cross-section the rigid metal tubular element 12 in its condition prior to collapse. The rigid tubular element or member 12 is shown in a preferred rectangular tubular shape. However, the rigid tubular element may be any suitable cross-sectional shape suitable for being put into collapsed form and then returned to its uncollapsed form in accordance with this invention. It may have a thin wall of low carbon steel or aluminum. It may be formed by roll-forming into the square shape shown, from flat strip, shaped as shown and closed with a linear weld along the butted edges. Alternatively, it may be formed in an extrusion process.

In the further shaping process, side wall portions 12a and 12b may be inwardly bent or dented therealong and the upper and lower walls 12c and 12d (FIG. 4) may be pressed together, the walls 12a and 12b folding inwardly at the dent sites. This forms a collapsed shape shown somewhat diagrammatically in FIG. 3 and including the accordion-type folds 15a and 15a in sidewalls 12a and 12b. In actual practice, these folds may be much tighter and more pronounced than shown, being subject to considerable forming pressure, the object being to make the element 12 as compact as reasonably possible.

Figure 1:
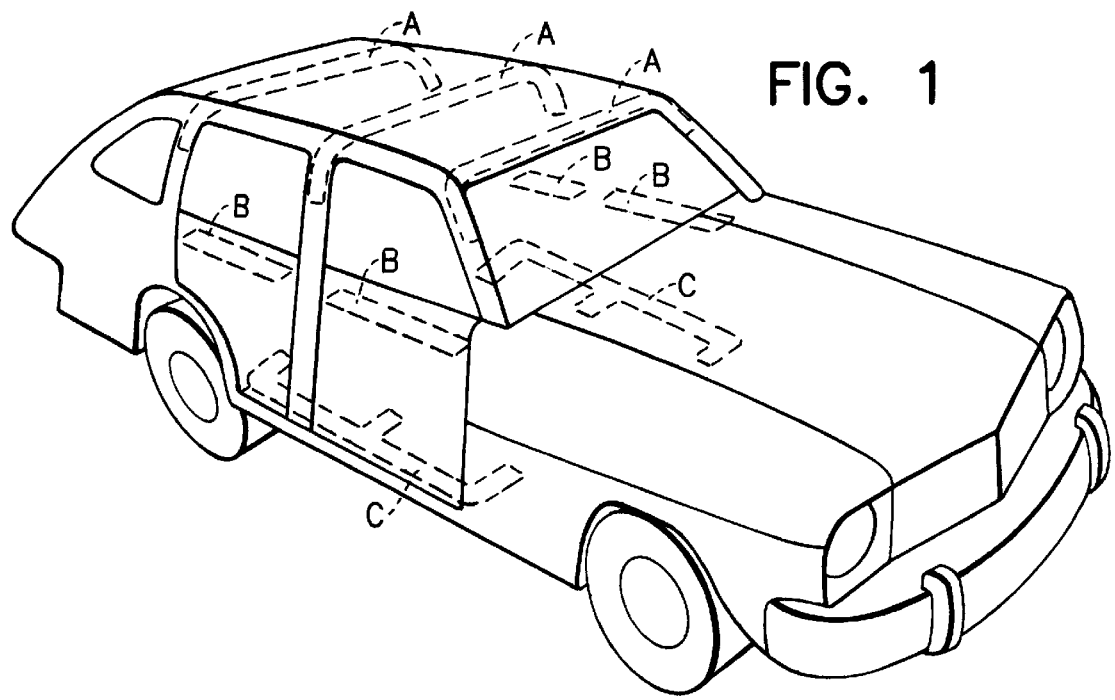
FIG. 1 is a perspective view of a vehicle and showing in phantom strategic positions for the structural assembly of the invention.

Referring now to FIG. 1, the structural assemblies described herein are strategically located in various positions in a vehicle. For instance, they may be shaped as in FIG. 2 and positioned across the top of the car as at A to provide roll bar protection. Preferably, the inflator 20 for those assemblies in the A position may be disposed in a vertical pillar as between the doors or to the rear or forward of the doors as shown. The elements at position A extend across the car between the roof shell and the overhead upholstery, taking up minimum room, the widest width being disposed horizontally. The far ends of the respective elements opposite from the inflator may extend down into corresponding pillars on the opposite sides of the car.

Another strategic location for the structural elements of the invention may be in or across the doors in the B positions. Each of these involves a relatively short straight length of tubular element and the inflator may be located closely thereadjacent, not specifically outlined in the drawings. Because of the compact nature of the collapsed element (it may be disposed with its wider width running vertically), there is still room for the normal reinforcing frame inside the door as well as the window when lowered and the window winding mechanism.

A form of structural assembly as described above may also be located in the C location under the chassis and at the level of an outside of and paralleling the underframe. Preferably, these elements include transverse inflatable sections as shown which are secured to the frame and provide struts used to support the longer inflatable structural element section running lengthwise of the car. The compact nature of the collapsed element is such that in its flattened condition, it does not limit or affect the road clearance.

Those skilled in the art will understand that for each element location, A, B or C, there is an optimum place for the impact sensor needed to actuate the inflator associated with each respective element.

Figure 3:
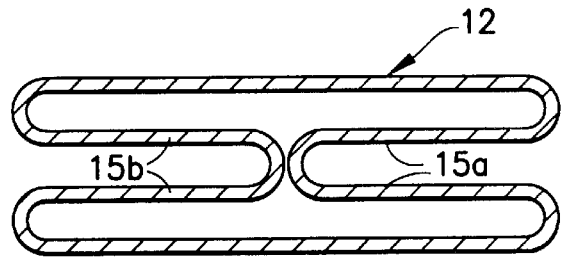
FIG. 3 is an enlarged sectional view taken on the line 3—3 of FIG. 2.

The invention, with regard to forming the element, has been described as first forming the uncollapsed or unflattened element (FIG. 4) and then collapsing it (FIG. 3). However, while this is the preferred way of making the structure, the element may also be made in its collapsed form as by extrusion. The invention, hence, includes the form of the invention wherein the collapsing procedure has in effect already been achieved.

Figure 5:
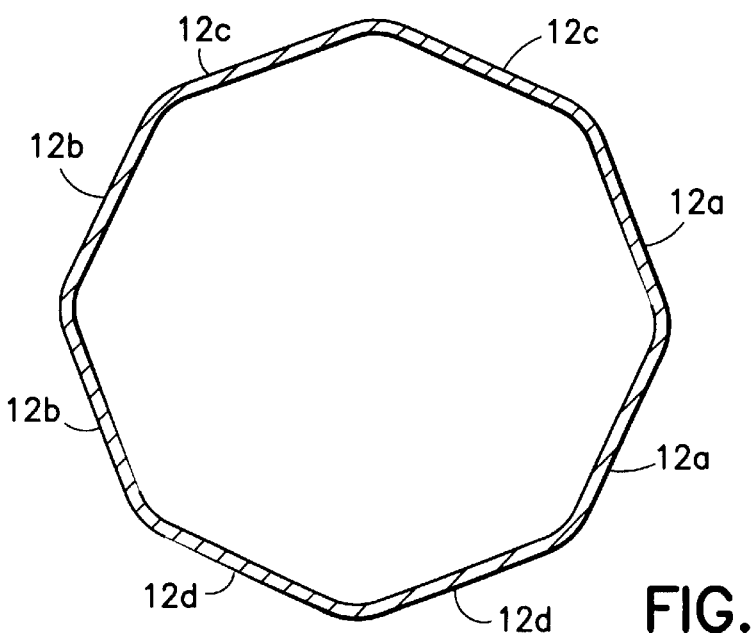
FIG. 5 is a view similar to FIG. 4 but showing the element further expanded by inflation, as by greater pressure.

In actual practice, it has been found that after collapsing, a 3 inch square structural steel tube of 0.065 inch wall thickness can be flattened to make it approximately one-third its original size. Subsequently, after using a pressure of approximately 100 psi, this flattened tube can be restored to its original square profile (FIG. 4). Inflating further to achieve a pressure of approximately 200 psi, the tube can, if desired, be expanded further to a more rounded shape (FIG. 5). Typically, it has been found that when inflating from an inflator canister (FIG. 2), inflation can take place. in approximately only 30 milliseconds from initiation.

It has been found that the ability of the tubular element, once inflated, to withstand buckling or sidewise collapse can be enhanced by continuing to keep the elevated pressure inside the element.

Variations in the invention are possible. Thus, while the invention has been shown in only one embodiment, it is not so limited but is of a scope defined by the following claim language which may be broadened by an extension of the right to exclude others from making, using or selling the invention as is appropriate under the doctrine of equivalents.

I claim:

1. A structural assembly comprising:
   (a) an elongate rigid tubular element having an original cross-sectional shape including opposite side wall portions, said element being transversely collapsed from its original shape to a collapsed shape wherein the side wall portions of the tubular element are compacted into tight accordion folds, the interior of the collapsed element being substantially closed to the atmosphere,
   (b) an activatable means for generating fluid pressure having a fluid discharge opening connected to the interior of the collapsed rigid tubular element,
   whereby the fluid pressure generated by the activatable means, when activated, restores the collapsed tubular element to substantially its original cross-sectional shape.

2. An assembly of claim 1 wherein the tubular element is a metal tubular element having an original cross-sectional shape that is rectangular.

3. An assembly of claim 2 wherein the activatable means comprises a gas-generating inflator.

4. An assembly of claim 3 wherein the inflator is capable of generating a gas pressure of at least 100 psi in the tubular element.

5. A motor vehicle having:
   (a) a structural element of claim 1 installed therein in a location wherein the structural assembly can prevent or limit damage to a portion of the vehicle in the event of impact, and
   (b) an impact sensor for activation of the activatable means for generating fluid pressure.

6. A vehicle of claim 5 wherein the tubular element is a metal tubular element having an original cross-sectional shape that is rectangular, and the activatable means comprises a gas-generating inflator capable of generating a gas pressure of at least 100 psi in the tubular element.

7. A motor vehicle of claim 6 wherein the structural assembly is installed transversely across a roof of the vehicle to serve as a roll bar.

8. A motor vehicle of claim 6 wherein the structural assembly is installed in a door of the vehicle to resist intrusion in the event of a side impact.

9. A motor vehicle of claim 6 wherein the structural assembly is installed longitudinally of the vehicle at a level of a frame member of the vehicle.

10. A vehicle of claim 9 wherein a further collapsed tubular element extends transverse of the vehicle at the level of the frame member of the vehicle and is connected to the first collapsed tubular element.

11. A method of reinforcing a portion of a vehicle in the event of impact thereto, the method including the steps of:
    (a) providing in the vehicle an elongate rigid tubular element having an original cross-sectional shape including opposite side wall portions, said tubular element being in a collapsed shape wherein the side wall portions of the tubular element are compacted into tight accordion folds, the interior of the collapsed element being substantially closed to the atmosphere, and a sensor activatable fluid pressure generating means in fluid communication with the closed interior of the collapsed tubular element; and
    (b) actuating the fluid pressure-generating means by the sensor sensing an impending impact, thereby rapidly pressurizing the interior of the collapsed tubular element by fluid pressure generated by the fluid pressure-generating means and restoring the collapsed tubular element to substantially its original cross-sectional shape.

12. The method of claim 11 wherein the fluid pressure generating means is a gas-generating inflator generating a gas pressure of at least 100 psi in the tubular element.

13. The method of claim 11 additionally comprising:
   (c) maintaining a pressure in the tubular element to increase the rigidity of the tubular element as well as increase its anti-buckling capability.

14. A structural assembly for installation in a motor vehicle, said structural assembly comprising:
   (a) an elongate rigid metal tubular element having a flattened shape, the interior of the element being substantially closed to the atmosphere,
   (b) an activatable means for generating fluid pressure, said activatable means having a discharge opening connected to the interior of the flattened metal tubular element, whereby fluid pressure generated upon activation of the means for generating fluid pressure can inflate the tubular element to an unflattened shape.

15. An assembly as claimed in claim 14 wherein the activatable means for generating fluid pressure comprises a gas-generating inflator capable of generating a pressure of at least 100 psi in the tubular element.

16. A motor vehicle having:
   (a) a structural element of claim 14 installed in the vehicle in a location wherein the structural assembly can prevent or limit damage to a portion of the vehicle in the event of impact, and
   (b) an impact sensor for activation of the activatable means for generating fluid pressure.

17. A vehicle of claim 16 wherein the tubular element is a metal tubular element having an original cross-sectional shape that is rectangular, and the activatable means comprises a gas-generating inflator capable of generating a gas pressure of at least 100 psi in the tubular element.

18. A motor vehicle of claim 17 wherein the structural assembly is installed transversely across a roof of the vehicle to serve as a roll bar.

19. A motor vehicle of claim 17 wherein the structural assembly is installed in a door of the vehicle to resist intrusion in the event of a side impact.

20. A motor vehicle of claim 17 wherein the assembly is installed longitudinally of a vehicle at a level of a frame member of the vehicle.

21. An assembly as claimed in claim 20 wherein a further flattened tubular element extends transverse of the vehicle at the level of the frame member of the vehicle and is connected to the first flattened tubular element.

22. A structural assembly as claimed in claim 17 wherein the inflator is located, at least partially, inside a part of the flattened tubular element.

23. A structural assembly as claimed in claim 14 wherein the unflattened cross-sectional shape of the tubular element is rectangular.

* * * * *